(12) United States Patent
Zhang (10) Patent No.: US 7,386,652 B2
(45) Date of Patent: *Jun. 10, 2008

(54) USER-CONFIGURABLE PRE-RECORDED MEMORY

(76) Inventor: Guobiao Zhang, P.O. Box 6182, Stateline, NV (US) 89449-6182

( * ) Notice: Subject to any disclaimer, the term of this patent is extended or adjusted under 35 U.S.C. 154(b) by 0 days.

This patent is subject to a terminal disclaimer.

(21) Appl. No.: 11/164,246

(22) Filed: Nov. 15, 2005

(65) Prior Publication Data

US 2006/0085615 A1    Apr. 20, 2006

Related U.S. Application Data

(63) Continuation-in-part of application No. 11/036,448, filed on Jan. 15, 2005.

(30) Foreign Application Priority Data

Nov. 15, 2004   (CN) .................... 2004 1 0081241

(51) Int. Cl.
  G06F 12/00 (2006.01)
  G06F 13/00 (2006.01)
  G06F 13/28 (2006.01)
  G11C 5/02 (2006.01)
  G11C 5/06 (2006.01)
  G11C 17/00 (2006.01)
(52) U.S. Cl. .................... 711/101; 365/51; 365/63; 365/94
(58) Field of Classification Search .................. 711/168
  See application file for complete search history.

(56) References Cited

U.S. PATENT DOCUMENTS

| 4,827,508 | A |   | 5/1989  | Shear ........................... 380/4 |
|-----------|---|---|---------|-------------------------------------|
| 4,977,594 | A |   | 12/1990 | Shear ........................... 380/4 |
| 5,010,571 | A |   | 4/1991  | Katznelson .................... 380/4 |
| 5,247,575 | A |   | 9/1993  | Sprague et al. ................ 380/9 |
| 5,619,247 | A |   | 4/1997  | Russo .......................... 348/3 |
| 5,629,980 | A |   | 5/1997  | Stefik et al. .................. 380/4 |
| 5,815,425 | A | * | 9/1998  | Wong et al. ................... 365/45 |
| 5,835,396 | A | * | 11/1998 | Zhang .......................... 365/51 |
| 5,857,020 | A |   | 1/1999  | Peterson, Jr. .................. 380/4 |
| 5,960,411 | A |   | 9/1999  | Hartman et al. .............. 705/26 |
| 6,091,886 | A |   | 7/2000  | Abecassis .................... 386/125 |
| 6,141,754 | A |   | 10/2000 | Choy ........................... 713/200 |
| 6,351,596 | B1 |  | 2/2002  | Ostrover ...................... 386/46 |
| 6,525,953 | B1 | * | 2/2003  | Johnson ....................... 365/63 |
| 6,560,135 | B2 | * | 5/2003  | Matsuoka et al. ............ 365/97 |
| 6,563,805 | B1 |  | 5/2003  | Ma et al. ..................... 370/325 |
| 6,624,485 | B2 | * | 9/2003  | Johnson ....................... 257/390 |

(Continued)

OTHER PUBLICATIONS

C. de Graaf, "*A Novel High-Density Low-Cost Diode Programmable Read Only Memory*", Technical Digest of International Electron Device Meeting, pp. 189-192, 1996.

*Primary Examiner*—Donald Sparks
*Assistant Examiner*—Ryan Bertram (57) ABSTRACT

In a user-configurable pre-recorded memory (UC-PM), a user can select contents he is interested in, and pay copyright fees accordingly. With large capacity, low cost and great integratibility, 3D-M, more particularly 3D-MPM, is suitable for UC-PM. It provides excellent access control and impenetrable copyright protection. UC-PM will enable a copyright distribution model fair to both copyright holders and users. On the other hand, the 3D-MPM scaling should be the fastest among all memory types.

5 Claims, 9 Drawing Sheets

U.S. PATENT DOCUMENTS

| | | | |
|---|---|---|---|
| 6,647,417 B1 | 11/2003 | Hunter et al. | 709/225 |
| 6,717,222 B2 | 4/2004 | Zhang | 257/390 |
| 6,789,192 B2 * | 9/2004 | Hirota et al. | 713/172 |
| 6,937,730 B1 | 8/2005 | Buxton | 380/241 |
| 6,973,576 B2 | 12/2005 | Giobbi | 713/193 |
| 2004/0206982 A1 * | 10/2004 | Lee et al. | 257/200 |

* cited by examiner

Fig. 1A
(Prior Arts)

USER-CONFIGURABLE PRE-RECORDED MEMORY

CROSS-REFERENCE TO RELATED APPLICATIONS

This application is a continuation-in-part of U.S. patent application Ser. No. 11/036,448, filed Jan. 15, 2005, which is related to U.S. Provisional Application No. 60/559,683, filed Apr. 4, 2004 and Chinese P.R. patent application No. 200410081241.X, filed Nov. 15, 2004.

BACKGROUND

1. Technical Field of the Invention

The present invention relates to the field of integrated circuits, and more particularly to user-configurable pre-recorded memory (UC-PM).

2. Related Arts

Pre-recorded memory (PM) refers to memory whose contents are recorded before the PM is obtained by a user. It is suitable for publishing, particularly for publishing copyrighted information, e.g. multimedia contents, electronic books, games, software, GPS maps, dictionary. Various types of non-volatile memory (NVM) can be used for PM, including mask-ROM, write-once memory (OTP), and write-many-times memory (WM).

Figure 1A:
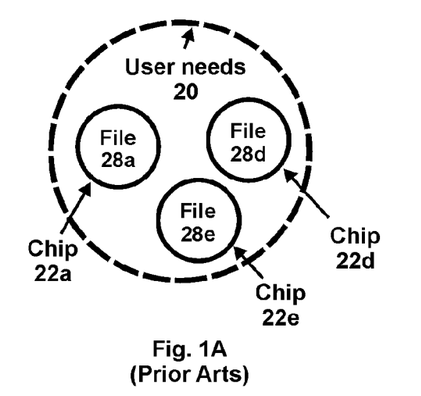
FIG. 1A illustrates the relative sizes of the PM capacity and user needs in prior arts.

As illustrated in FIG. 1A, a prior-art PM chip (e.g. 22d) holds just one or few pre-recorded files (e.g. file 28d). In order to meet user needs 20 (e.g. including files 28a, 28d, 28e), a large number of PM chips are needed (e.g. 22a, 22d, 22e).

Figure 1B:
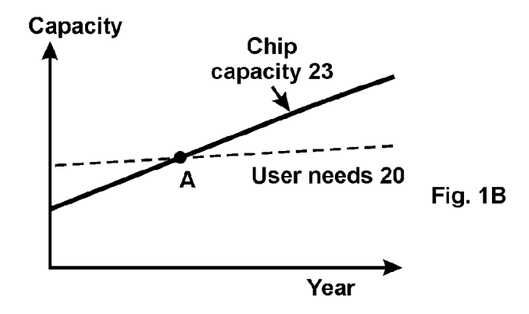
FIG. 1B illustrates the relative growth trend of the PM capacity and user needs.

As illustrated in FIG. 1B, with the advancement of semiconductor technology, the PM chip capacity 23 increases dramatically. However, the user needs 20 increase at a much slower rate (thanks to the more efficient compression techniques). As a result, at point A, one or few PM chips can meet the user needs 20.

Figure 1C:
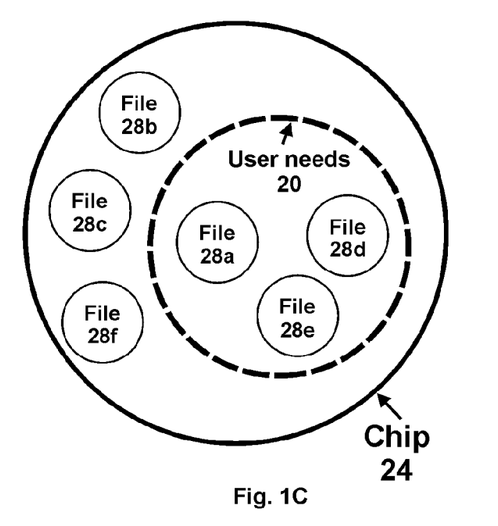
FIG. 1C illustrates the relative sizes of the chip capacity and user needs for an UC-PM in the present invention.

As illustrated in FIG. 1C, with further improvement in chip capacity 23 (after point A of FIG. 1B), a PM chip 24 can not only meet the needs from an individual user, but also meet the most needs for general users. Three-dimensional memory (3D-M, referring to U.S. Pat. No. 5,835,396) is such a device. Its storage capacity will soon reach 4 GB, which is equivalent to 1,000 songs. This capacity can meet the music needs for most users.

The PM is suitable for storing copyrighted contents. When its storage capacity reaches the level illustrated in FIG. 1C, a PM chip 24 can store a large amount of copyrighted contents. The copyright fees associated with these contents would be huge. If unlimited access is granted, this PM chip would be very expensive, as the copyright fee will far exceed the chip cost. In fact, a user may just want access to some contents (e.g. files 28a, 28d, 28e), but not others (e.g. files 28b, 28c, 28f). To be fair, the user should just pay copyright fees for the contents he is interested in (e.g. files 28a, 28d, 28e). Accordingly, the present invention discloses a user-configurable pre-recorded memory (UC-PM). In a UC-PM, a user can select contents he is interested in, and pay copyright fees accordingly.

Objects and Advantages

It is a principle object of the present invention to provide a pre-recorded memory from which a user can select contents he is interested in.

It is a further object of the present invention to provide a pre-recorded memory from which a user only pays the copyright fees for the contents he chooses to access.

It is a further object of the present invention to provide a copyright distribution model fair to both copyright holders and users.

In accordance with these and other objects of the present invention, a user-configurable pre-recorded memory (UC-PM) is disclosed.

SUMMARY OF THE INVENTION

With a large capacity, a single PM chip may contain a large amount of copyrighted contents. The copyright fees for these contents are huge. Naturally, a user does not wish to pay copyright fees for the contents he does not wish to access. Accordingly, the present invention discloses a user-configurable pre-recorded memory (UC-PM). In a UC-MPM, a user can select contents he is interested in, and pay copyright fees accordingly. Take a music chip (i.e. a PM chip containing copyrighted songs) as an example. An as-sold music chip has little music access (e.g. a user can listen to a song several times as trial). When a user decides to own a song, he will purchase file-access from the copyright holder through medium such as internet or telephone.

With a large capacity and low cost, three-dimensional memory (3D-M), more particularly, three-dimensional mask-programmable memory (3D-MPM), is suitable for storing pre-recorded contents. More importantly, the substrate of the 3D-M, more particularly 3D-MPM, can be used to form access control circuit. With the pre-recorded contents and access control integrated into a single chip, it would be very difficult for pirates to steal copyright information from the PM chip. As a result, 3D-M, more particularly 3D-MPM, is suitable for UC-PM. Together with decryptor, decoder and digital-to-analog converter, 3D-M-based UC-PM provides excellent access control and impenetrable copyright protection to the contents it carries (referring to U.S. Pat. No. 6,717,222).

The UC-PM, more particularly 3D-M-based UC-PM, will enable a new copyright distribution model—UC-PM model. Because it provides excellent access control and impenetrable copyright protection, an UC-PM chip can be sold for a price much lower than its hardware cost (or nearly free). As a user purchases more and more copyrighted contents, the hardware manufacturer will recoup the hardware cost from the purchasing prices. This is unlikely for the conventional PM's which are based on optical discs (CD, DVD) or standalone NVM. Because these PM's offer little access control and copyright protection, a user needs to pay copyright fees for all copyrighted contents thereon (even for the files he has little interest in). This leads to a high PM price and will prevent users from enjoying more multimedia contents.

The present invention also discloses a content-memory. It comprises a user-memory and an UC-PM. The user-memory stores user-contents, i.e. contents specific to a user. It may use flash memory or hard-disk drive (HDD) and its contents are typically downloaded. The UC-PM stores general contents, i.e. contents that meet the most needs for general users. Because the contents in the UC-PM are pre-recorded, a user does not need to download contents. This offers the user a lot of convenience. The content-memory combines the low-cost, large-capacity and convenience of the UC-PM with the flexibility of the user-memory. As a result, the overall content storage cost can be lowered.

The present invention also provides a narrow-line 3D-MPM. Because the transistor scaling is more stringent than diode (the transistor scaling is limited by many factors, such as lithography, gate material, gate dielectric and channel/source/drain engineering; the diode scaling is limited more or less by lithography alone), the minimum line pitch of the diode-based memory is smaller than the transistor-based memory (here, "line" means address-selection line). Accordingly, this type of diode-based memory is referred to as narrow-line diode-memory. Because it is purely a diode-based memory (unlike 3D-EPROM whose cell contains antifuse), 3D-MPM is most suitable for narrow-line diode-memory. In sum, the 3D-MPM scaling should be the fastest among all memory types.

DETAILED DESCRIPTION OF THE PREFERRED EMBODIMENT

Those of ordinary skills in the art will realize that the following description of the present invention is illustrative only and is not intended to be in any way limiting. Other embodiments of the invention will readily suggest themselves to such skilled persons from an examination of the within disclosure.

1. User-Configurable Pre-Recorded Memory (UC-PM)

The present invention discloses a user-configurable pre-recorded memory (UC-PM). In a UC-PM, a user can select contents he is interested in, and pay copyright fees accordingly. Take a music chip (i.e. a PM chip containing copyrighted songs) as an example. An as-sold music chip has little music access (e.g. a user can listen to a song several times as trial). When a user decides to own a song, he will purchase file-access from the copyright holder through medium such as internet or telephone.

Figure 2A:
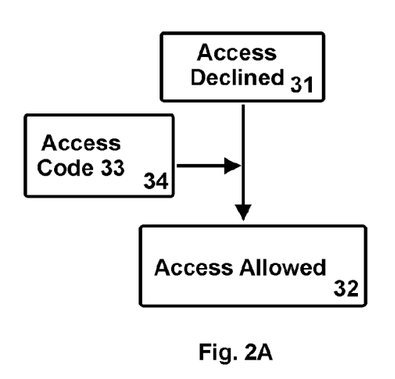
FIG. 2A illustrates a first preferred usage model of the UC-PM.
Figure 2B:
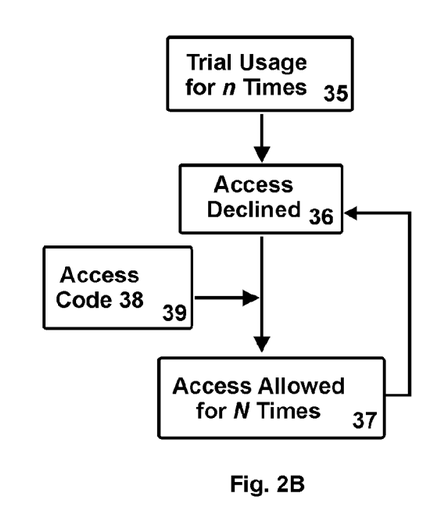
FIG. 2B illustrates a second preferred usage model of the UC-PM.

FIGS. 2A-2B illustrate two preferred usage models of the UC-PM. This preferred UC-PM chip 88 carries pre-recorded songs (music files). In FIG. 2A, initially there is no access to the music files in the UC-PM 88 (step 31). After inputting an access code 33 (step 34) to the chip, a user can listen to the song(s) associated with this access code 33 (step 32).

In FIG. 2B, initially there is a trial period. During this period, a user is allowed to listen to each song for n times as trial, or use the UC-PM for a pre-determined time (step 35). After this period, no further access is allowed (step 36). Only after an access code 38 is input into the chip (step 39), a user is allowed to listen to its associated song for N times (step 37). For example, for access code A, a song can be listened to for 5 times; for access code B, a song can be listened to for unlimited number of times (referring to FIG. 5A for more details). It should be apparent to those skilled in the art that other usage models of the UC-PM are also feasible.

Figure 3A:
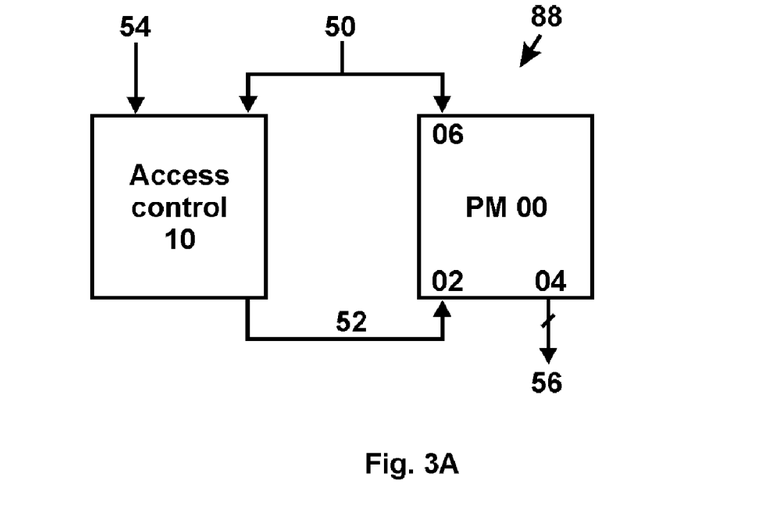
FIG. 3A is a block diagram of a preferred UC-PM.

Referring now to FIG. 3A, a block diagram of a preferred UC-PM 88 is illustrated. It is comprised of a PM 00 and an access-control block 10. The PM 00 stores the pre-recorded contents. It has the following ports: address 06, read enable 02, output 04, etc. The access-control block 10 controls access to different contents. It is further explained in the next paragraph.

Figure 3B:
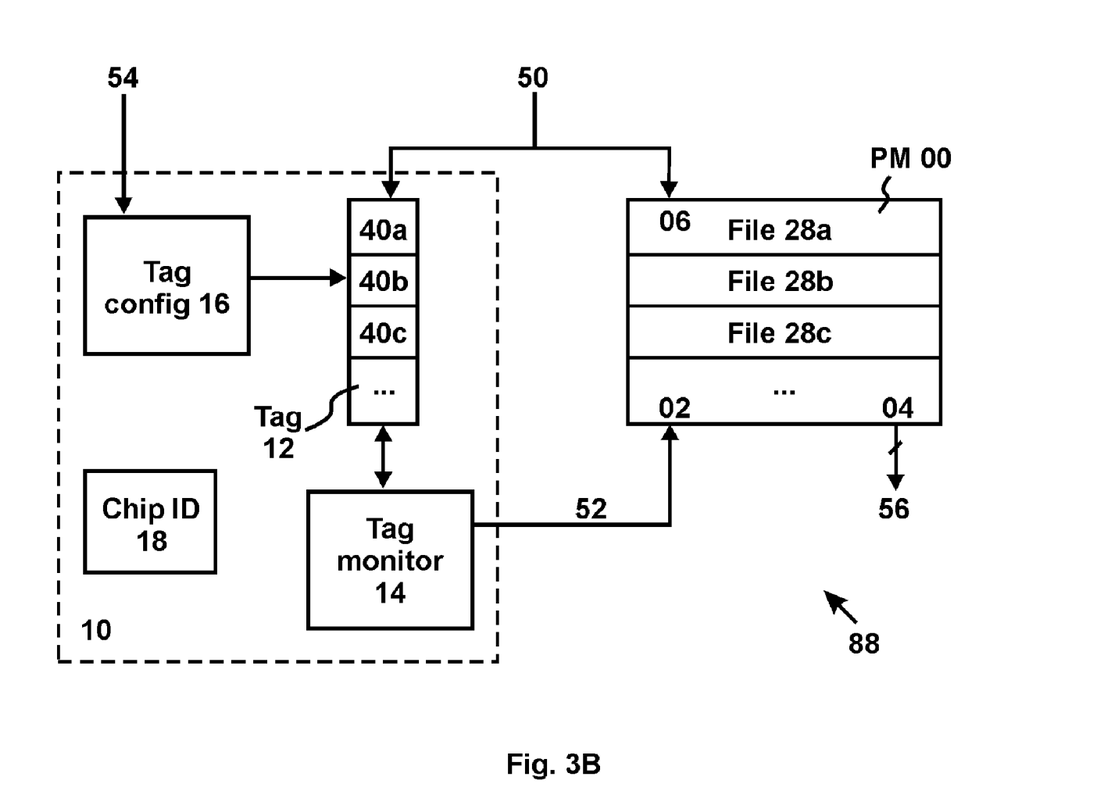
FIG. 3B is a block diagram of a preferred access-control circuit.

As illustrated in FIG. 3B, the access-control block 10 comprises a chip ID 18, a tag block 12, a tag-monitor block (optional) 14 and a tag-configuration block 16. The chip ID 18 is a unique number used to identify the UC-PM 88. It can be stored in write-once memory (OTP) or write-many-times memory (WM). The tag block 12 comprises tags for each file (e.g. 40a for file 28a, 40b for file 28b . . . ). Each tag contains accessibility information (e.g. number of remaining accesses). The PM 00 and the tag block 12 are addressed by a same file index 50. Based on the tag value, the tag-monitor block 14 sends out a read-enable signal 52, which controls the PM output 56. The tag-configuration block 16 sets the tag value based on the access code 54 input by the user.

UC-PM 88 has two working modes: content-read mode and tag-configuration mode. In the content-read mode, a user reads out the files he has access to (FIGS. 4A-4B); in the tag-configuration mode, a user inputs an access code to the UC-PM 88 and sets the tag value of the interested file.

Figure 4A:
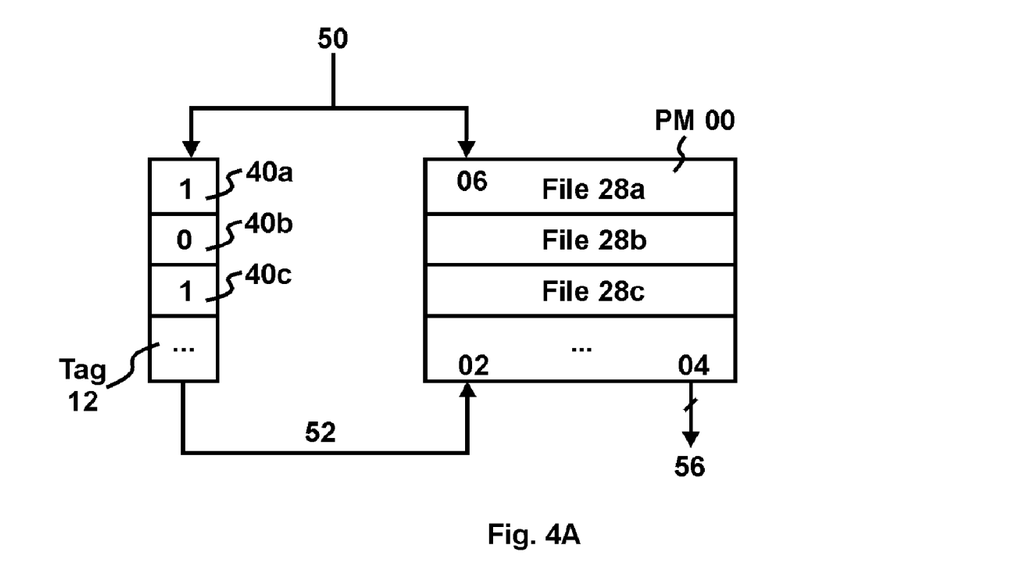
FIG. 4A illustrates a first preferred read-out circuit.

FIG. 4A illustrates a first preferred read-out circuit. It corresponds to the first usage model of FIG. 2A. During read-out, the PM 00 and the tag block 12 are addressed by a same file index 50. In this preferred embodiment, the tag value has a single bit. If the tag value (e.g. 40a) is "1", signal 52 enables read access to the associated file (e.g. 28a); otherwise, no access is allowed.

In this preferred embodiment, once the tag value is set, it stays unchanged. Thus, the tag block 12 can use write-once memory (OTP). One preferred OTP is XPM memory from Kilopass Inc. (referring U.S. Pat. No. 6,777,757). XPM memory is compatible to the standard CMOS circuit, requires no process change and is relatively easy to implement. Another preferred OTP is the three-dimensional electrically-programmable memory (3D-EPROM). It can be integrated with the PM. Note that these OTP's can also be used to store chip ID 18.

Figure 4B:
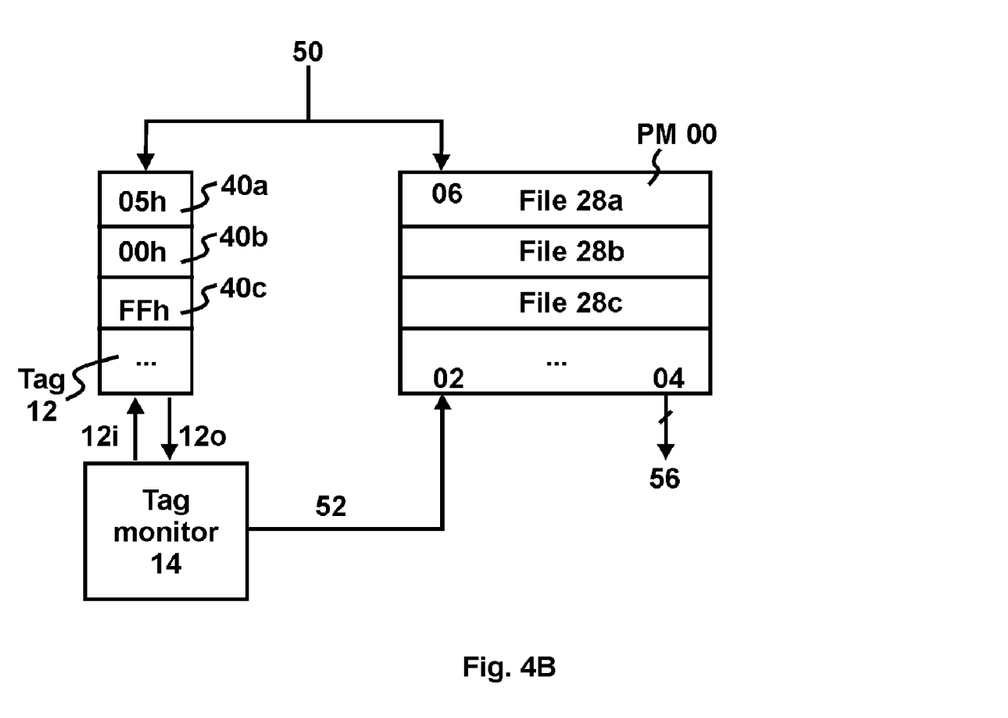
FIG. 4B illustrates a second preferred read-out circuit.

FIG. 4B illustrates a second preferred read-out circuit. It corresponds to the second usage model of FIG. 2B. Different from FIG. 4A, the tag value is the number of remaining accesses and it comprises more than one bit. In this preferred embodiment, the tag comprises 8 bits. For example, "05h" (in 40a) means there are 5 times of remaining accesses to file 28a; "00h" (in 40b) means there is no (0 times) access to file 28b; "FFh" (in 40c) means there is unlimited access to file 28c (here, "FFh" is singled out for unlimited access).

During read-out, the tag block 12 is accessed first. If its output 12o> "00h", the output 52 of the tag-monitor block 14 is "1" and the corresponding file from the PM 00 is read out; otherwise no file is read out. The tag-monitor block 14 can update the tag value after each read-out. When "00h"<12o<"FFh", the tag-monitor block 14 decreases 12o by 1, and writes 12i (12i=12o–1) back to the tag 12; under other circumstances, the tag-monitor block 14 does not update the tag block 12.

Figure 5A:
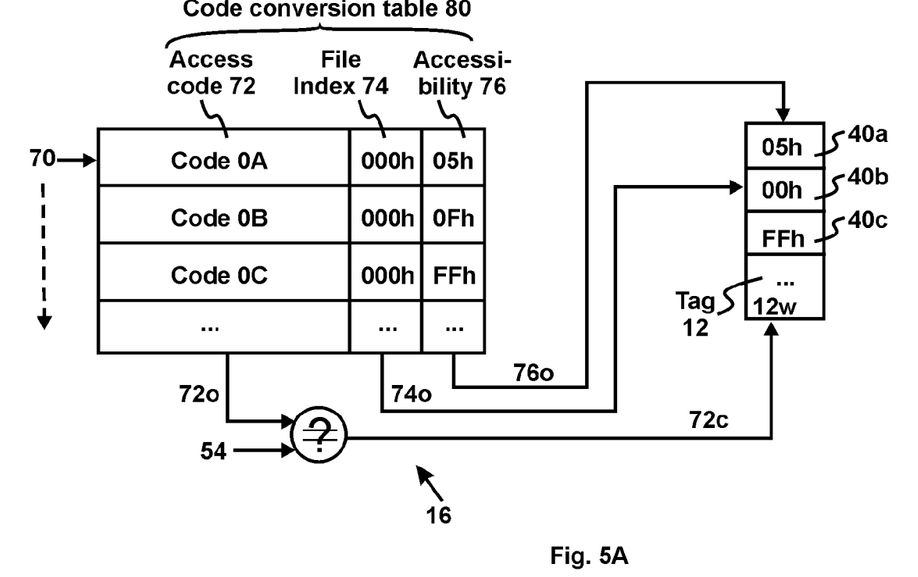
FIG. 5A illustrates a first preferred tag-configuration circuit.

FIG. 5A illustrates a first preferred tag-configuration block 16. It sets the tag value based on the access code 54 input by the user. Its major component is a code-conversion table 80. The code-conversion table 80 provides a one-to-one correspondence between access code and file/accessibility. It comprises a number of entries 70. Each entry 70 contains an access code 72, file index 74 and accessibility 76. For example, "Code 0A" means 5 times ("05h") of accesses are allowed for the file with index 000h; "Code 0B" means 15 times ("0Fh") of accesses are allowed for file 000h; "Code 0C" means unlimited ("FFh") accesses are allowed for file 000h.

In order to protect copyright, even for the same file and accessibility, different chip needs to use different access code. Accordingly, the code-conversion table 80 should use write-many-times memory (WM) or write-once-memory (OTP). The preferred OTP includes XPM memory or 3D-EPROM.

When an access code 54 is input by the user, the tag-configuration block 16 searches through the code-conversion table 80. If the output 72o from the table 80 matches the input access code 54, signal 72c is set to "1" and sent to the write-enable port 12w of the tag block 12. Thus, using the file index 74o as address, the accessibility 76o can be written into the tag block 12.

Figure 5B:
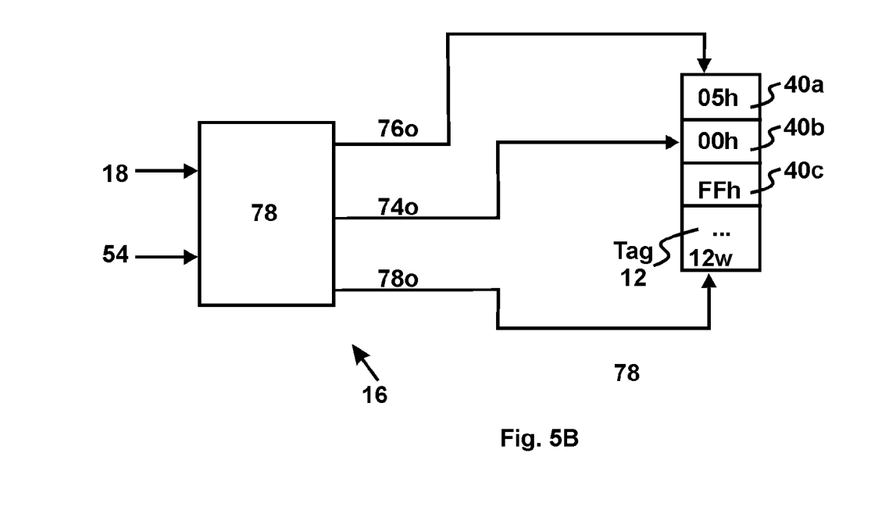
FIG. 5B illustrates a second preferred tag-configuration circuit.

FIG. 5B illustrates a second preferred tag-configuration block 16. It uses an algorithm (Functions A & B) to calculate the file index 74o and accessibility 76o, based on the access code 54 and chip ID 18. Namely, File index 74o=Function A (Access code 54, Chip ID 18);  Eq. (1)

Accessibility 76o=Function B (Access code 54, Chip ID 18).  Eq. (2)

This algorithm can be implemented by a code-converter 78, which is a piece of hardware that implements Functions A & B. Note the output of the code-converter 78 further comprises a validity bit 78o. When the input access code 54 is a valid code, 78o is set to "1" and sent to the write-enable port 12w of the tag block 12. Thus, using the file index 74o as address, the accessibility 76o can be written into the tag block 12. When 54 is invalid, 78o is set to "0" and no write is allowed to the tag block 12.

Figure 6:
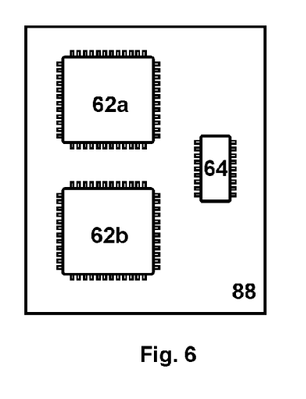
FIG. 6 illustrates an UC-PM based on standalone chips.

FIG. 6 illustrates an UC-PM 88 based on standalone chips. It comprises two PM chips 62a, 62b and an access control chip 64. The PM chips 62a, 62b carry the pre-recorded contents and the access control chip 64 performs the function of the access-control block 10. Because pirates may steal copyrighted contents directly from PM chips 62a, 62b, further improvement is needed for this UC-PM 88.

Figure 7:
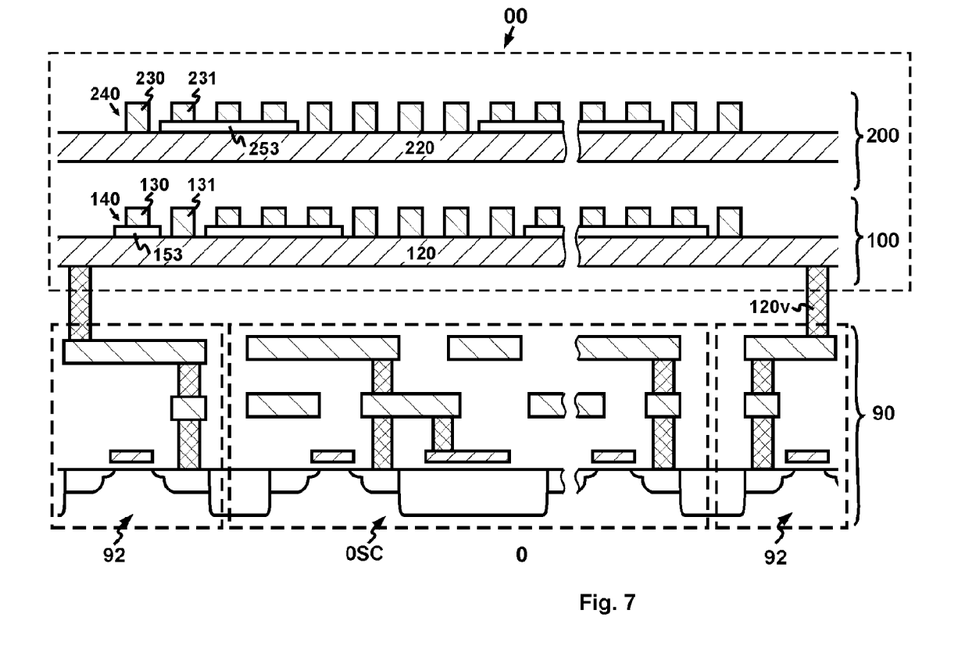
FIG. 7 illustrates a three-dimensional memory (3D-M)

FIG. 7 illustrates a three-dimensional memory (3D-M, referring to U.S. Pat. No. 5,835,396). In this 3D-M 00, two memory levels (100, 200) are stacked on top of each other and then substrate 0. Each memory level comprises address lines (word lines 120, 220 . . . ; bit lines 130, 131, 230, 231 . . . ) and memory cells (140, 240 . . . ). Memory level 100 connects with substrate 0 through inter-level vias 120v. 3D-M could be either electrically programmable 3-D memory (EP-3DM, e.g. write-once 3D-M, write-many-times 3D-M); or non-electrically programmable 3-D memory (NEP-3DM, e.g. 3D-MPM). This preferred embodiment is a 3D-MPM. Configuration dielectric 153, 253 defines the digital information at each cell location. Its existence (e.g. cell 140) represents digital "0"; its absence (e.g. cell 240) represents digital "1".

Figure 8A:
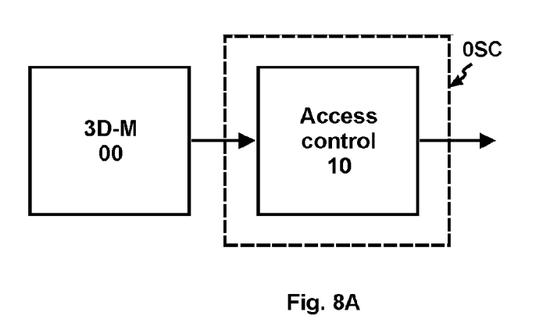
FIG. 8A illustrates a first preferred 3D-M-based UC-PM.
Figure 8B:
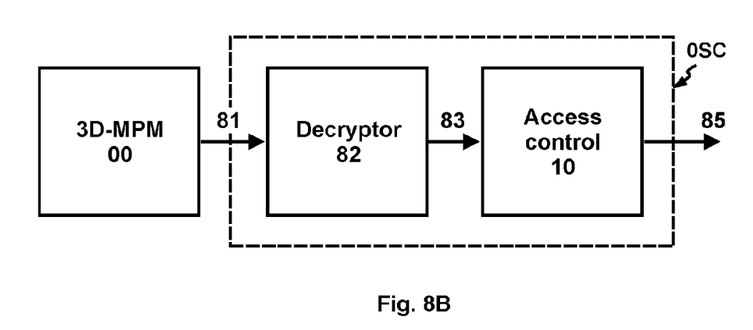
FIG. 8B illustrates a second preferred 3D-M-based UC-PM.
Figure 8C:
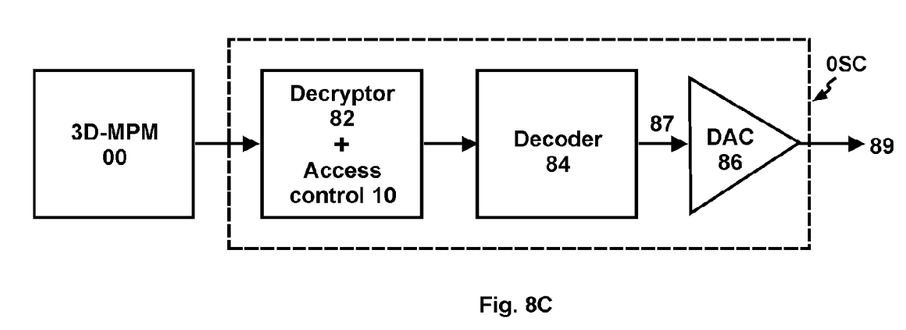
FIG. 8C illustrates a third preferred 3D-M-based UC-PM.

With a large capacity and low cost, 3D-M (more particularly, 3D-MPM) is suitable for storing pre-recorded contents. More importantly, because its memory cells do not occupy substrate 0 (except for peripheral circuits 92), the substrate 0 of the 3D-M (more particularly 3D-MPM) can be used to form substrate circuit 0SC. These substrate circuits 0SC can be used to perform various functions, such as providing access control and copyright protection. FIGS. 8A-8C illustrate several preferred 3D-M-based UC-PM chips.

Referring now to FIG. 8A, a first preferred 3D-M-based UC-PM is illustrated. Its access-control block 10 is integrated into the substrate circuits 0SC. Located underneath the 3D-M array 00, this access-control block 10 cannot be tampered with. As a result, this preferred embodiment provides excellent access control.

3D-MPM is particularly ideal for UC-PM. For 3D-MPM, pirates might steal copyrighted contents by reverse-engineering the configuration-dielectric patterns (153, 253 . . . ) (using means such as de-layering). To prevent this from happening, the data stored in the 3D-MPM array 00 are preferably encrypted. Accordingly, in the preferred embodiment of FIG. 8B, the substrate circuit 0SC further comprises a decryptor 82. It decrypts the encrypted data 81 from the 3D-MPM 00 to its original unencrypted form 83. Because both the access-control block 10 and decryptor 82 are located underneath the 3D-MPM array 00, they cannot be tampered with. Accordingly, this preferred embodiment provides excellent access control and copyright protection.

Another copyright concern is that pirates might digitally copy the output signals from the PM (e.g. the output signals 85 of FIG. 8B). To address this concern, multimedia outputs (e.g. audio/video output) from the UC-PM are preferably analog signals. Even though pirates might re-digitize these analog signals, the signal quality will be severely degraded.

The preferred 3D-MPM-based UC-PM in FIG. 8C adopts such a copyright-protection scheme. Besides access control 10 and decryptor 82, its substrate circuit 0SC further comprises a decoder 84 and a digital-to-analog converter (DAC) 86. The decoder 84 converts the pre-recorded contents (usually compressed) into un-compressed digital format. Typical decoders 84 include audio decoders (e.g. mp3 decoder), video decoders (e.g. jpeg decoder, mpeg decoder). Then DAC 86 converts these digital data 87 into analog signals 89. Analog signals 89 could be analog signals in conventional sense (e.g. voltage amplitude), or pulse-width modulation (PWM)/pulse-position modulation (PPM) signals. Because the decoder 84 and DAC 86 are located underneath the 3D-MPM array 00 as well, they cannot be tampered with. This preferred embodiment can achieve excellent access control and impenetrable copyright protection. Its commercial potentials are boundless.

Figure 9A:
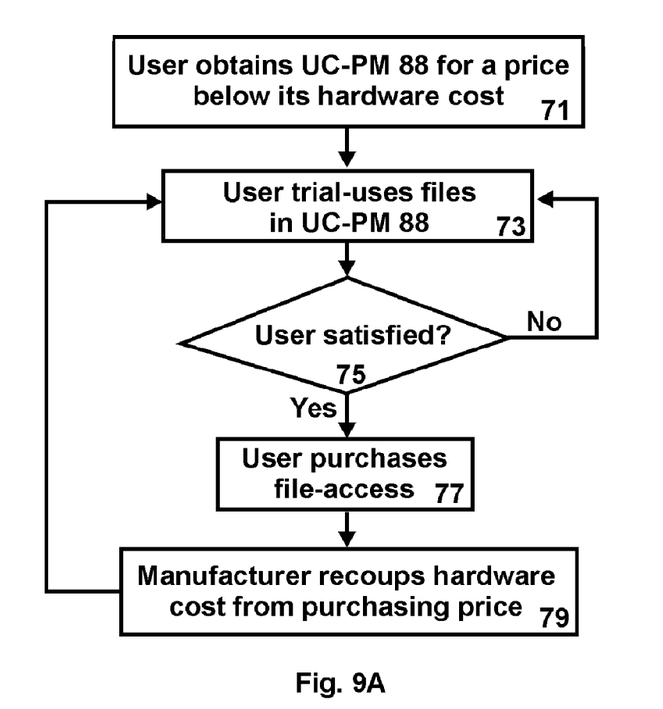
FIG. 9A illustrates a preferred copyright distribution model.

The present invention further discloses a copyright distribution model—UC-PM model. As illustrated in FIG. 9A, because it provides excellent access control and impenetrable copyright protection, an UC-PM (more particularly, 3D-MPM-based UC-PM) chip can be sold for a price much lower than its hardware cost (or nearly free) (step 71). A user may trial-use a file (or files) during the trial period (step 73). If he is satisfied (step 75), he may purchase the file-access (step 77). In the meantime, the chip manufacturer recoups a portion of the hardware cost from the purchasing price (step 79). This is unlikely for the conventional PM's which are based on optical discs (CD, DVD) or standalone NVM. Because these PM's offer little access control and copyright protection, a user needs to pay copyright fees for all copyrighted contents thereon (even for the files he has little interest in). This leads to a high PM price and will prevent users from enjoying more multimedia contents. Apparently, this UC-PM model is fair to both copyright holders and users.

Figure 9B:
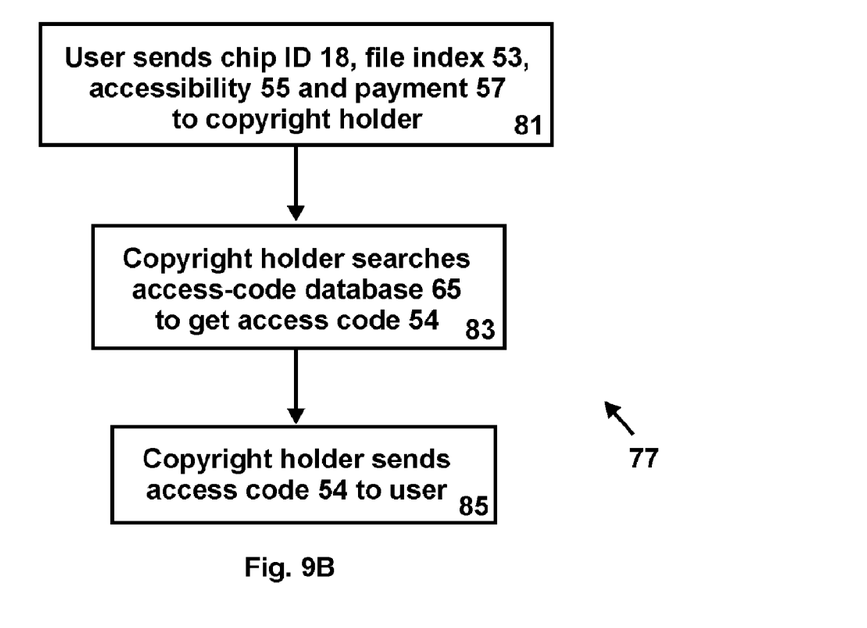
FIG. 9B illustrates a preferred method for a user to purchase file-access.

FIG. 9B illustrates a preferred method for a user to purchase file-access 77. This preferred method is a payment-before-access method. When a user decides to gain access to a file, he sends the chip ID 18, its files index 53, desired accessibility 57 and payment 57, to the copyright holder through internet or telephone (step 81). The copyright holder searches the access-code database 65 and gets the access code 54 for this file (step 83). After that, the copyright holder sends the access code 54 to the user (step 85). Once the user inputs the access code 54 into the UC-PM 88, he obtains the desired access.

Figures 9C, 10:
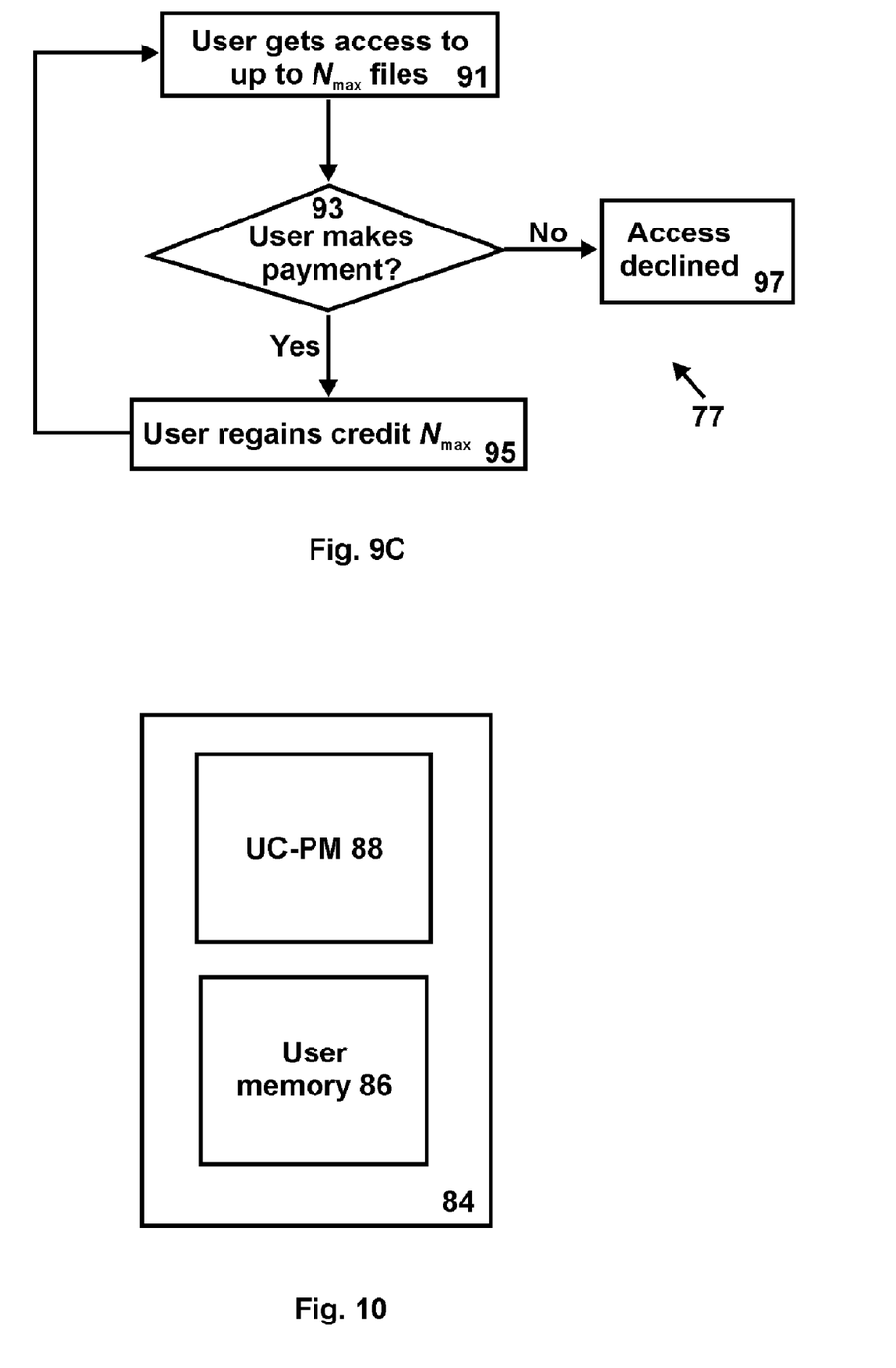
FIG. 9C illustrates another preferred method for a user to purchase file-access.
FIG. 10 illustrates a preferred content-memory.

FIG. 9C illustrates another preferred method for a user to purchase file-access 77. This preferred method is a payment-after-access method, i.e. a user can buy contents on credit. To be more specific, an UC-PM 88 allows a user to select access to up to $N_{max}$ files without making any payment (step 91). Here, $N_{max}$ is the credit limit, i.e. the largest number of files a user can access without making any payment. If a user makes a timely payment (step 93), his credit counter will be reset to $N_{max}$ (step 95); otherwise, access to these contents will be declined (step 97). Payment-after-access allows a user to gain access to desired files, even when no communication is available with the copyright holder.

FIG. 10 illustrates a content-memory 84. It comprises a user-memory 86 and an UC-PM 88. The user-memory 86 stores user-contents, i.e. contents specific to a user. It may use flash memory or hard-disk drive (HDD) and its contents are typically downloaded. The UC-PM 88 stores general contents, i.e. contents that meet the most needs for general users. Because the contents in the UC-PM 88 are pre-recorded, a user does not need to download contents. This offers the user a lot of convenience. The content-memory 84 combines the low-cost, large-capacity and convenience of the UC-PM 88 with the flexibility of the user-memory 86. As a result, the overall content storage cost can be lowered.

2. Narrow-line 3D-MPM

Currently, transistors (CMOS) are the bottleneck for technology scaling. Its scaling involves many factors, e.g. lithography, gate material, gate dielectric material, channel/source/drain engineering and others. On the other hand, diode scaling is much simpler: it is more or less limited by lithography alone. Accordingly, diode follows different scaling law than transistor:

1) its feature-size f (half-pitch between address-selection lines in FIG. 11A) could be much smaller than the transistor feature-size F (half-pitch between gate poly). For example, diode may use f=60 nm technology, when transistor still uses F=90 nm technology.

2) its scaling can occur at a much faster rate than transistor. For example, it may take two years to scale diode down for one generation, while it will take three years for transistor.

Diode-based memory can have narrower address-selection lines than transistor-based memory. Accordingly, this type of diode-based memory is referred to as narrow-line diode-memory. Narrow-line diode-memory will have a larger density than transistor-based memory and this density gap will grow even bigger.

Figure 11A:
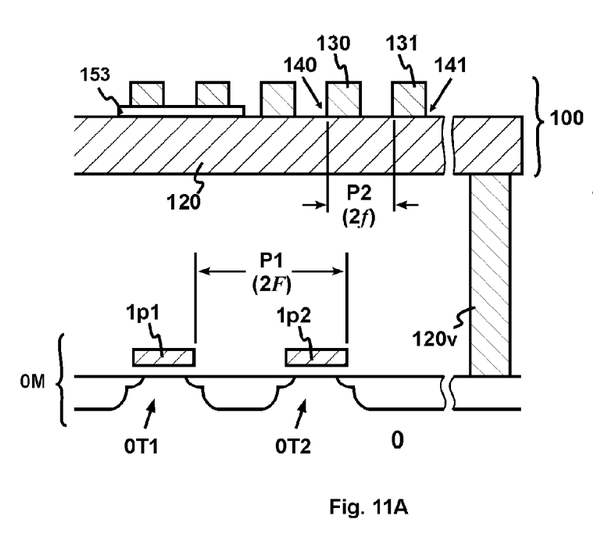
FIG. 11A is a cross-sectional view of a preferred narrow-line 3D-MPM.

Because it is purely a diode-based memory (unlike 3D-EPROM whose cell contains antifuse), 3D-MPM is most suitable for narrow-line diode-memory. Accordingly, the present invention discloses a narrow-line 3D-MPM. As illustrated in FIG. 11A, it comprises a diode-based memory 100 and a transistor-based memory 0M. The minimum line-pitch in the diode-based memory 100 is between address-selection lines 130, 131, i.e. P2=2f, the minimum line-pitch in the transistor-based memory 00 is between poly gate 1p2, 1p2, i.e. P1=2F As a narrow-line 3D-MPM, P2<P1. Note that, because transistor 0T1, 0T2 (in substrate 0) and diodes 140, 141 (on top of substrate 0) are formed in separate manufacturing steps, they can be scaled independently. In sum, the 3D-MPM scaling should be the fastest among all memory types.

Figure 11B:
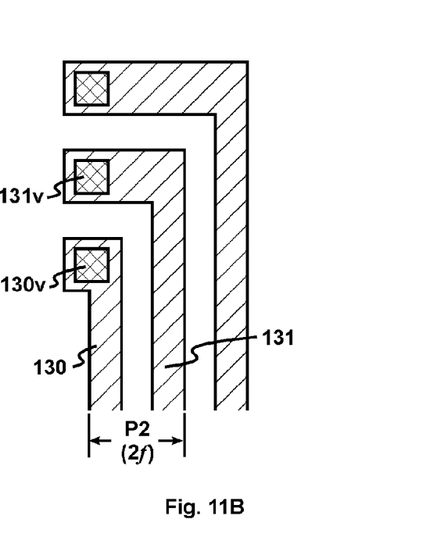
FIG. 11B is its layout view.

The inter-level via 120v may use technology (i.e. the size of the inter-level via is f), or F technology (i.e. the size of the inter-level via is F). To use the F technology, the address-selection lines 130, 131 need to be bent for an angle so that larger via spacing (F instead of f) can be accommodated in the layout (FIG. 11B).

3. Wide-word-line 3D-M

Figure 12:
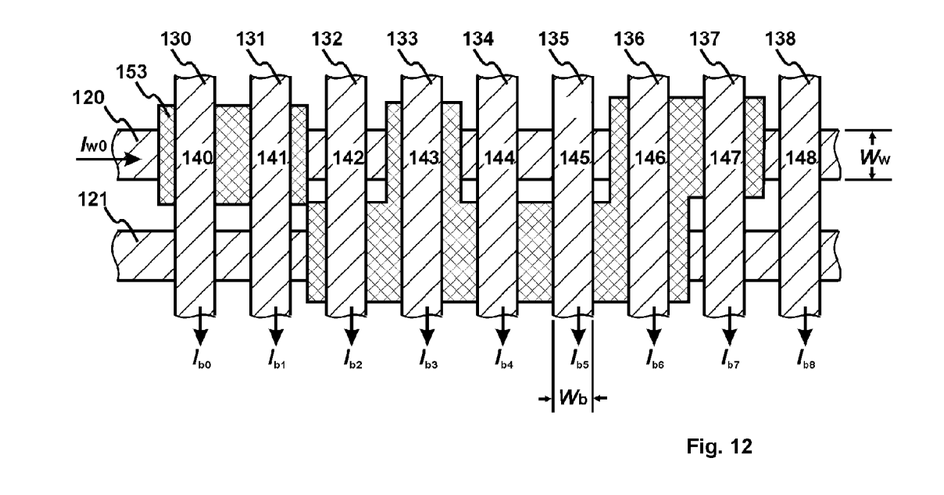
FIG. 12 is a layout view of a preferred wide-word-line 3D-M.

To improve yield, the present invention discloses a wide-word-line 3D-M. To be more specific, the width $W_w$ of its word lines 120, 121 is larger than the width $W_b$ of its bit lines 130, 131 . . . ($W_w$>$W_b$) (FIG. 12). This is mainly due to the fact that the yield of 3D-M is more susceptible to word-line defects than bit-line defects. The reason is as follows: during read-out, a single word line is addressed in a unit array and a number of cells on said word line are read out at the same time. If the word line has a defect, all cells on this word line cannot be read out. On the other hand, if the bit line has a defect, there would be a single error in the read-out. This can be corrected by error-correction circuit (ECC), e.g. ECC based on Hamming code (referring to FIG. 24 of U.S. Pat. No. 6,717,222). To improve yield, wide word lines are preferred for 3D-M, because a wider line has less defect.

Wide word line can also prevent excessive word-line voltage drop during read-out. During read-out, a single word line 120 is addressed in a unit array and a number of cells are read out at the same time. Accordingly, the word line needs to provide current for all bit lines under read, i.e. $I_{w0}=I_{b2}+I_{b4}+I_{b5}+I_{b8}$ (in FIG. 12, $I_{b0}$, $I_{b1}$, $I_{b3}$, $I_{b6}$, $I_{b7}$=0). In a real circuit, the number of bit lines can easily reach $10^4$. As a result, the current in word line can be much larger than bit line. To avoid excessive voltage drop thereon, the word line preferably has a low sheet-rho. Methods to lower the sheet-rho include: A) use a wide word line; B) use a thick word line; C) word line uses a more conductive material (e.g. metal or metallic alloy). Apparently, any or a combination of above methods can be used.

While illustrative embodiments have been shown and described, it would be apparent to those skilled in the art that many more modifications than that have been mentioned above are possible without departing from the inventive concepts set forth therein. The invention, therefore, is not to be limited except in the spirit of the appended claims.

What is claimed is:

1. A narrow-line three-dimensional memory (3D-M), comprising:
   a substrate having a transistor-based memory, said transistor-based memory comprising a plurality of transistors and a plurality of first address-selection lines in parallel; and
   a diode-based memory stacked above said substrate and coupled to said substrate through a plurality of inter-level vias, said diode-based memory comprising a plurality of diodes and a plurality of second address-selection lines in parallel;
   wherein said diode-based memory comprises no transistors, and the minimum pitch of said second address-selection lines is smaller than the minimum pitch of said first address-selection lines.

2. The narrow-line 3D-M according to claim 1, wherein the size of said inter-level vias is larger than the minimum half-pitch of said second address-selection lines.

3. The narrow-line 3D-M according to claim 1, wherein said diode-based memory is a mask-programmable memory.

4. The narrow-line 3D-M according to claim 3, wherein said mask-programmable memory comprises no antifuse.

5. The narrow-line 3D-M according to claim 3, wherein the size of said inter-level vias is larger than the minimum half-pitch of said second address-selection lines.

* * * * *